Oct. 5, 1948.  R. J. HOWISON  2,450,592
STAMPED CHAIN CONNECTOR
Filed Nov. 30, 1942  2 Sheets-Sheet 1
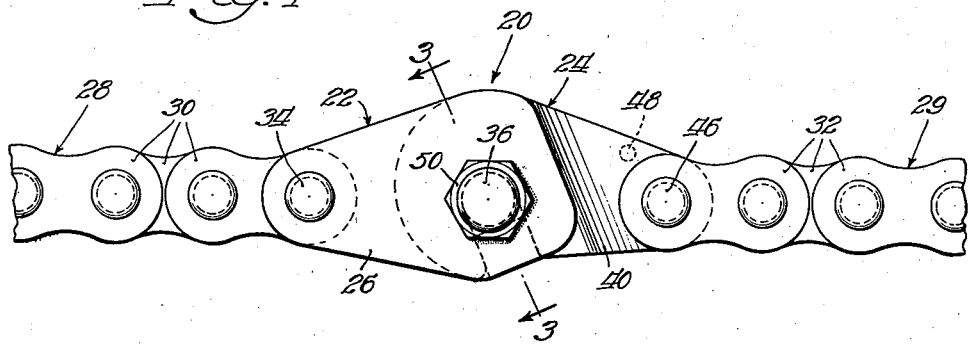
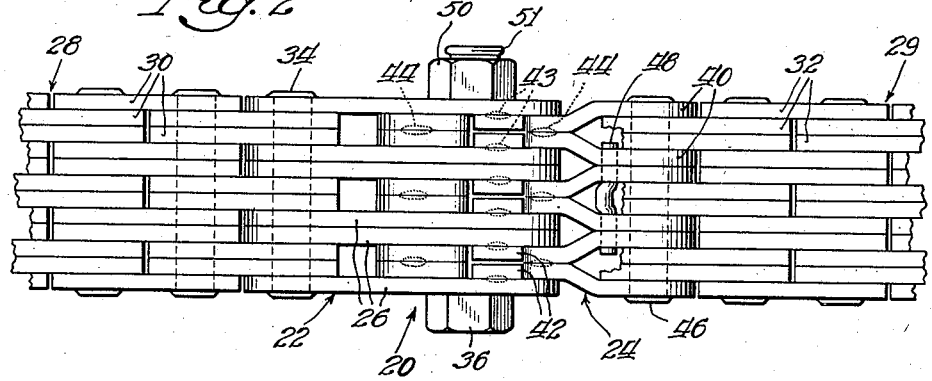
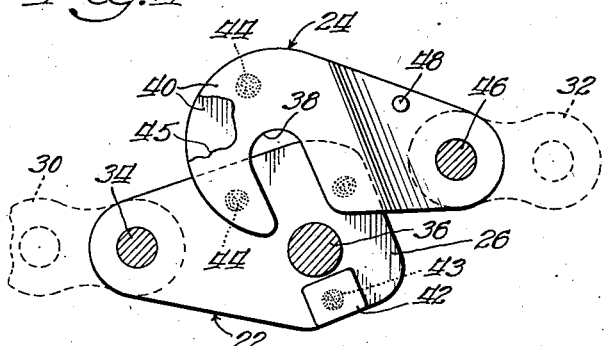
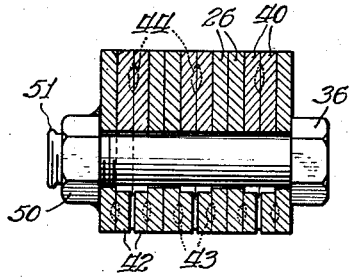
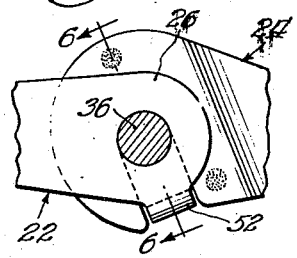
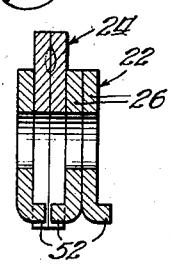
Inventor:
Robert J. Howison
By:
Edward C. Gritzbaugh
Atty.

Oct. 5, 1948.  R. J. HOWISON  2,450,592
STAMPED CHAIN CONNECTOR
Filed Nov. 30, 1942  2 Sheets-Sheet 2
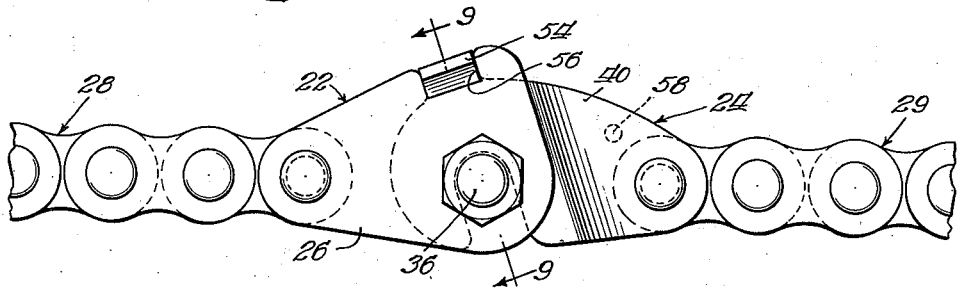
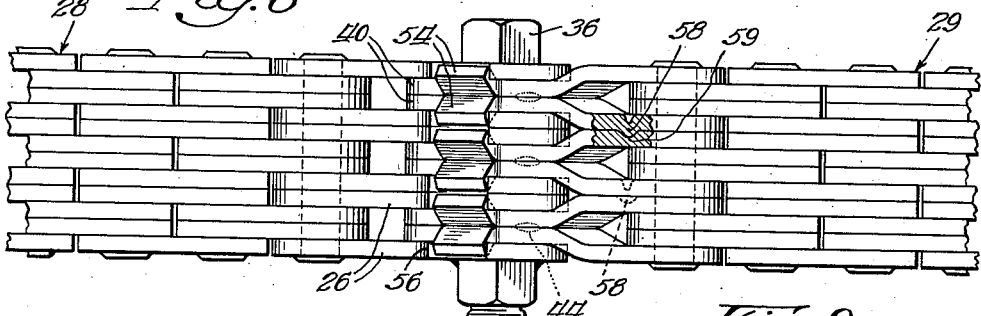
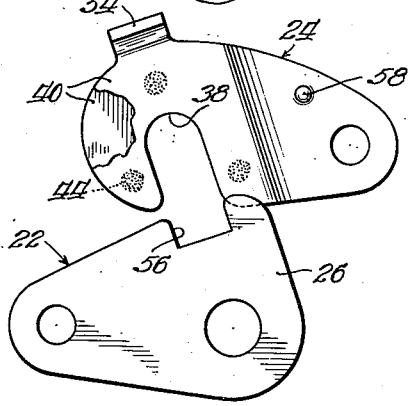
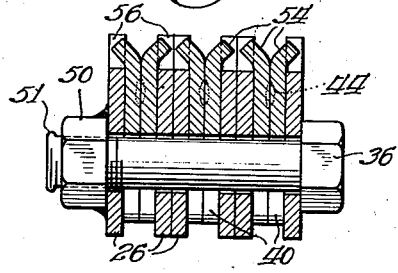
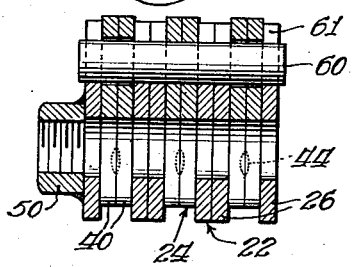
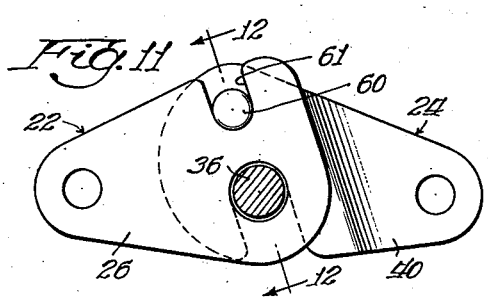
Inventor:
Robert J. Howison
By: Edward C. Fitzhugh
Atty.

Patented Oct. 5, 1948

2,450,592

UNITED STATES PATENT OFFICE 2,450,592

STAMPED CHAIN CONNECTOR

Robert J. Howison, Detroit, Mich., assignor to Morse Chain Company, Ithaca, N. Y., a corporation of New York Application November 30, 1942, Serial No. 467,314

4 Claims. (Cl. 74—258)

This invention relates primarily to connectors and the like. The principal object of the invention is to provide an improved connector for connecting the ends of one or more chains. A device of this type is useful and desirable for connecting sections, for example, of an industrial chain drive or the ends of chain segments used to carry the shoes on an endless tread for vehicles, and for other purposes.

In the past, it has been customary to form these connectors of solid pieces of steel, or forgings which have required extensive machining operations, with the consequent expense and use of scarce machinery now needed in the war effort. Further, in the construction heretofore on the market, either the hook portion or the yoke portion has been narrowed at a neck portion between the place of connection and the chain. In the event of a twist or unexpected strain, the undue stress is not absorbed on the whole of the chain but is concentrated in the narrowed portion of the hook or the yoke as the case may be. In such event there is a tendency to snap which requires a comparatively heavy construction for a normal load.

It is an object to provide a construction in which the use of forgings or the like with consequent extensive machining operations, is eliminated. It is a further object of the invention to provide a construction in which the yoke and hook members are of laminated construction, and made from blanks or stampings of sheet metal. In this connection it is pointed out that the machinery and tools necessary for forming the laminated members of the yoke and hook disclosed herein are comparatively plentiful and are readily available.

It is an object of this invention to provide a device or connector developed from blanks or punched sheet metal plates which are formed, if desired, entirely on presses with punches and dies at considerably reduced material costs and waste, and which will permit rapid connection and disconnection of sections to be joined. In this connection it is an object to provide a construction in which the number of blanks or laminations may be varied according to the problem to be met, and the hook and yoke comprising the connector member may thus be varied in width and strength. This allows the manufacture of all blanks for various sizes of connectors, on a single machine.

It is an important object of this invention to provide a construction in which the yoke and hook members are quickly and easily joined or disconnected as desired by a single manipulation and the tightening or loosening of a bolt. In this connection, it is an object to provide means preventing articulation or bending of the hook and yoke with respect to each other, thus eliminating undue wear on the bolt of the yoke and on the eye of the hook. It is an object, therefore, to provide a construction in which the laminated members may be compressed tightly together causing a locking action and thus relieving some of the tension and strain on the bolt.

The forming of the blanks by die-stamping, or otherwise, normally results in the formation of relatively small concavities and convexities in the stampings.

It is an object to make use of these irregularities by tightening these parts together when connecting the yoke and hook to form the connector and thus securing a restraining tendency against articulation (preventing undue wear on the bolt and in the eye of the hook) and producing an action similar to a lock washer so that when the parts are compressed by tightening the bolt, the compression holds the bolt from becoming loose at the wrong time.

It is a further object to provide a connector in which the nut for the bolt passing through the yoke is spot-welded or otherwise fastened to the side of the yoke, and the end of the bolt, after threading on the nut, is enlarged so it is held from leaving the nut. This results in the bolt becoming an integral portion of the yoke, and will remove any possible danger of the bolt becoming detached. The spot-welding of the nut to the yoke makes the tightening and loosening of the bolt a simple thing.

It is a purpose of this invention to disclose a connector in which the laminations or blanks are connected together by spot-welding or otherwise.

It is likewise an object of the invention to provide an arrangement in which the laminations forming hook portions are pierced by a pin or key, or the like, and are thus made into a single or integral section, so that the operator will have only to contend with the whole, and not with the individual blanks, when making or breaking the connection. It is an object to disclose a novel means of inserting and retaining this pin or key in position.

It is an important object of this invention to disclose improved and novel means of preventing articulation.

It is an object of the invention also to disclose a hook comprising a plurality of stamped and formed links or blanks, with the hook slot or eye in each blank at an angle which cannot readily become unhooked when the device is under tension, and can only be disconnected from the yoke when the tension on the hook is substantially eliminated.

These and other objects and features of this invention will become apparent from the following specification when taken together with the accompanying drawings in which:

Fig. 1 is a side elevational view showing a connector as disclosed herein in assembled or connected position, the connector being shown as connecting two sections of a link type chain;

Fig. 2 is a bottom view of the device of Fig. 1;

Fig. 3 is a cross-sectional view taken on the line 3—3 of Fig. 1, looking in the direction of the arrows;

Fig. 4 is a side elevational view partially broken away, showing the hook member disconnected from the yoke member, but in relative position whereby a slight movement will connect the hook member to the yoke member;

Fig. 5 is a fragmentary side elevational view illustrating a modified means for preventing articulation between the hook and yoke.

Fig. 6 is a cross-sectional view of several blanks forming yoke and hook assemblies in connected position, the view being taken on the line 6—6 of Fig. 5, looking in the direction of the arrows;

Fig. 7 is a view corresponding generally to Fig. 1, but showing another modified form of articulation preventing means;

Fig. 8 is a top or plan view of the device of Fig. 7;

Fig. 9 is a cross-sectional view taken on the line 9—9 of Fig. 7 looking in the direction of the arrows. This view also clearly illustrates the expedient of welding the nut to a yoke blank;

Fig. 10 is a side elevational view, partly broken away, and it shows the yoke and hook members in relative position for movement to form the connection, the figures disclosing a construction as shown in Figs. 7, 8 and 9;

Fig. 11 is a side elevational view, which shows the yoke and hook members in engaged position, and discloses a modified form of articulation preventing means; and Fig. 12 is a cross-sectional view taken on the line 12—12 of Fig. 11 looking in the direction of the arrows.

Referring more in detail to the construction shown in the various figures, and referring first to Figs. 1, 2 and 3, in particular, there is disclosed a connector referred to in its entirety as connector 20 comprising a yoke 22 and a hook 24.

The yoke 22 is, in turn, composed or constructed of a plurality of blanks 26, formed of sheet metal stampings or the like. As is illustrated in Fig. 2, the blanks 26 of the yoke 22 are preferably spaced apart either singly or in pairs. The preferable construction as illustrated in Figs. 1, 2 and 3, discloses the outer blanks of the yoke 22 as comprising a single blank of material in each instance, and spaced therefrom at intervals are double blanks.

This arrangement especially adapts itself to the inclusion of the yoke in a chain formed of links of generally similar material. The chains 28 and 29, constructed of links 30 and 32, respectively, are used for illustrative purposes herein.

The yoke 22 is disclosed herein as attached to the chain 28 by means of the pin 34. The blanks 26 of the yoke 22 are spaced apart, as indicated in Fig. 2, by the links 30 of the chain 28. These blanks 26, preferably at the time of forming, have a hole punched therein to receive a clamping means such as a tightening bolt 36. This bolt 36 passes through the blanks 26 and connects a plurality of such blanks together in spaced relation, thus forming the yoke 22 into an integral part or unit. The bolt 36 receives and seats the eyes 38 of the blanks 40 forming the hook 24. The blanks 40 are preferably spaced for insertion into the spaces left between the blanks 26 of the yoke.

The blanks 26 are provided with an articulation preventing means such as the lug 42, which is preferably rectangular, and generally corresponds in width to the width of the eye of the hook. This lug 42 is attached, such as by spot-welding as shown at 43, to the blank 26 at a position where it will be engaged by the eye of the hook 40 when the hook 40 is seated in engaged position on the bolt 36. The main purpose of the lug 42 is to prevent the hook 24 from moving with respect to the yoke 22, when the device is in assembled or connected position. In this manner, articulation is effectively prevented in the connector, and the undue wear which would take place if there were relative movement between the hook and yoke, is thus eliminated. Figure 4 is broken away at 45 to show the arrangement of two blanks 40 into a unit by spot-welding.

Where the hook 24 is composed of a plurality of blanks 40, it is desirable to make the several blanks into a unitary construction. The blanks are shown, particularly in Figs. 2 and 3, as generally arranged in pairs. Each blank 40 of the hook 24 may be formed separately, but where arranged in pairs as shown in Fig. 2, the two blanks constituting a pair ordinarily should be attached by spot-welding as shown at 44. Several spot-welds may be provided, which in addition to attaching the blanks together, have the effect of increasing the roughening or convexing and concaving the surfaces of the blanks which will be exposed to contact with the blanks forming the yoke 22. This entire concaving or convexing has the desirable result of causing the parts to grip better upon tightening on the bolt 36 and, what is possibly more important, produces a lock-washer action preventing loosening of the bolt 36 in operation. Blanks made by stampings as herein referred to generally have at least minute distortions of their surfaces, thus making them particularly effective for use on the device herein disclosed.

The blanks 40 of the hook 24, when assembled in pairs, are preferably bifurcated, as illustrated in Fig. 2. This distributes the load of the pull on the chains 28 and 29, and provides the space for insertion of the attaching chain links 32, as shown in Fig. 2, so that the hook 24 and the chain 29 may be attached by means of the pin 46. The bifurcating also permits the insertion of a key 48 though a hole drilled or punched in the blanks 40 for that purpose. The key 48 thus inserted is preferably bent or distorted in the center as shown in Fig. 2, for the purpose of retaining it in position. This key 48 locks the blanks 40 into a unitary construction so that they form the hook 24. The reason for the forming of the hook 24 in a single unitary part is that it is thus easily and readily handled in connecting and disconnecting the parts forming the connector.

It will be apparent from the examination of the construction indicated in Figs. 3, 9 and 12, that the nut 50 may be spot-welded or otherwise attached to the side blank of the yoke 22. Preferably the bolt 36 has the end enlargement 51 as indicated clearly in Fig. 3. This enlargement is for the purpose of preventing the bolt becoming detached from the nut 50. It may be formed by peening the end of the bolt after it is inserted in the nut. Sufficient space must be left between the enlarged end of the bolt and the nut to allow loosening of the bolt so that the yoke and hook may be readily put together and taken apart. With this arrangement, the bolt and nut become an integral part of the yoke and will not be lost.

Due to the slant of the eye 38, there is little or no danger of the hook 24 becoming disconnected as long as there is tension on the chain or device on which it is used, and thus since there is little or no danger of losing the bolt 36 due to the enlarged end and the spot welding of the nut, the device makes a very desirable connector for such use as connecting the ends of tank treads, or for forming a readily removable tread for dual wheel trucks, or the like.

Referring to the construction shown in Figs. 5 and 6, the ear 52 has been provided to take the place of the lug 42, or to supplement the lug 42. The ear 52 is preferably formed of the same blank of material as the blank 26 of the yoke 22, is integral therewith, and is bent so as to enter the eye of the hook 24. If two blanks of material 26 are spot-welded or placed together as is shown in Fig. 6, then the respective ears will be bent outwardly or apart to a position in which they are engaged by the hook, as shown. These ears serve the purpose of preventing articulation of the connector.

Referring next to the modified construction shown in Figs. 7, 8, 9 and 10, there is provided a hook lug 54 which is preferably integral with the blank 40 of the hook 24. These hook lugs are adapted to fit into and engage a recess 56 in the yoke blanks 26. With this arrangement, the hook blank is held against relative movement with respect to the yoke blank 26, by means of engagement of the lug 54 with the recess 56. This eliminates the necessity for spot-welding or otherwise attaching a lug, such as lug 42, on the blank 26. It is understood, however, that the lug 42 may be used to supplement the hook lug 54, if desired.

Figs. 8 and 10 show a construction in which the key 48 may be eliminated by providing mating punch marks or irregularities 58 and 59 which hold the laminated blanks 40 against relative movement when they are clamped together as by means of the pin 46.

Referring next to constructions shown in Figs. 11 and 12, there is provided another modification of a connector of the general type described herein, in which the bar 60 forms the engaging member retaining the connector against articulation. This bar 60 takes the place of the lug 54 and lug 42 as well as ear 52 above described.

The bar 60 is inserted in the hook 24. This bar 60 preferably fits the center blank or blanks of the hook member with a very tight fit, so that the bar is retained against movement after once being inserted in place. The outer blanks, that is, all except the center blanks, fit the bar with a clearance around the bar 60, so that when the blanks are tightened into position upon the tightening of the bolt 36, they may move inwardly to form the lock-washer action above described, and gripping of the parts as above pointed out.

This bar may be moved into place in the center blanks, as above indicated, by heating the blanks and shrinking them on to the bar when the device is manufactured, or attached by welding, or otherwise, and the bar thus becomes an integral portion of the hook. In such an arrangement it is unnecessary to provide the key 48 or the punch portions 58 and 59. The bar 60 makes the assembly into a unitary arrangement. As was the case in the yoke blank shown in Fig. 10, the blank of Fig. 11 is recessed at 61. This recess 61 should conform generally to the shape of the bar 60, so that there will be no substantial relative movement between the parts when the hook is in place.

In the operation of this device, the yoke 22 forms one end of a chain 28 and the hook 24 the end of a chain 29 or similar device, and the yoke and hook are connected by inserting the hook 24 into the spaces between the laminations of the yoke 22. The arrangement herein provided makes this connection a simple and quick matter, which is extremely important under conditions of operation in the field, it merely being necessary to relieve the tension slightly on the chains, and insert the eye or hook slot 38 of the hook over the bolt 36. The chains are then preferably tightened, and the head of the bolt is turned into a tightened position so as to lock the lamination together. The connector is then held against articulation and the bolt has exerted thereon a lock-washer action which keeps it tight in operation. To release the device, it is merely necessary to release the tension on the connector, and then unscrew the bolt 36 so as to loosen the pressure between the laminations, then lift the hook off of the yoke. The slant of the eye of each lamination on the hook, retains the device against unexpected release due to unintentional loosening of the bolt 36.

It is understood that the foregoing description is merely illustrative of a preferred embodiment of the invention and that the scope of the invention therefore is not to be limited thereto but is to be determined by the appended claims.

I claim:

1. A laminated connector comprising yoke and hook mating parts each formed of a plurality of blanks, means releasably retaining said yoke and hook parts together, means substantially eliminating articulation between said yoke and hook parts, said means comprising a bar through the laminations on said hook part and retained in said position, and bar engaging recesses in the laminations of said yoke, the arrangement being such that the bar engages said recesses when the yoke and hook means are together, the yoke and hook means having means attaching each of them to devices to be connected.

2. A device of the class described comprising yoke and hook mating parts, said yoke being constructed of spaced and grouped blanks and having means comprising a bolt passing through the blanks forming them into an integral structure and providing seating means receiving a mating hook and tightening means for said parts, said yoke having means attaching it to a chain or the like to be connected, said hook being likewise constructed of blanks and having eye portions slanted to be held on the bolt under tension on the connector and adapted to seat on and engage said bolt in said yoke, said hook having said blanks spaced and grouped to mate with the spacings and groupings of said yoke, the blanks forming said hook being connected into a unitary structure and said hook having means attaching it to a chain or the like to be connected, and means in connection with said yoke and hook preventing articulation, the entire arrangement being such that tightening the bolt with the hook and yoke mated locks the hook and yoke together.

3. A device of the class described comprising in combination a yoke constructed of a plurality of sheet metal stampings formed into yoke blanks, a hook likewise constructed of a plurality of sheet metal stampings formed into hook blanks and having hook eyes, means in connection with said yoke receiving and releasably retaining said hook in position to form a connector with said yoke, said receiving and retaining means comprising a bolt passing through the blanks forming the yoke, a nut for said bolt spot-welded to the yoke, said bolt having its end portion enlarged after it is inserted in position, the blanks of said yoke and the blanks of said hook being alternately grouped and spaced, said blanks having slightly distorted surfaces whereby tightening of the bolt occasions a lock washer action thereon by the blanks, and means in connection with said yoke and hook cooperating with said bolt means retaining said yoke and hook against articulation.

4. A laminated connector comprising yoke and hook mating parts each formed of a plurality of blanks, means releasably retaining said yoke and hook together, and means for substantially eliminating articulation therebetween, said means comprising a lug attached to the yoke blanks and positioned to engage the eye of the hook blank when the parts are retained together.

ROBERT J. HOWISON.

REFERENCES CITED

The following references are of record in the file of this patent:

UNITED STATES PATENTS

| Number | Name | Date |
|---|---|---|
| 562,550 | Merritt | June 23, 1896 |
| 600,595 | Pond | Mar. 15, 1898 |
| 610,583 | Fox | Sept. 13, 1898 |
| 1,013,054 | Pierce | Dec. 26, 1911 |
| 1,094,200 | Dodge | Apr. 21, 1914 |
| 1,141,869 | Douglas | June 1, 1915 |
| 1,938,415 | Campbell | Dec. 5, 1933 |
| 2,153,003 | Myers et al. | Apr. 4, 1939 |
| 2,284,565 | Emmons | May 26, 1942 |
| 2,318,683 | Galanot et al. | May 11, 1943 |

FOREIGN PATENTS

| Number | Country | Date |
|---|---|---|
| 15,809 | Great Britain | Dec. 1, 1884 |